March 15, 1927. 1,621,216
F. W. PETERS
UNIVERSAL JOINT
Filed May 1, 1924 2 Sheets-Sheet 1
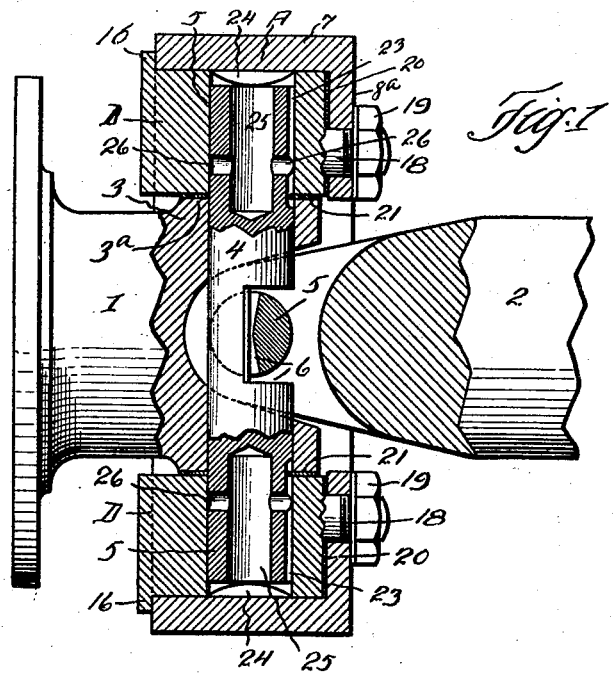
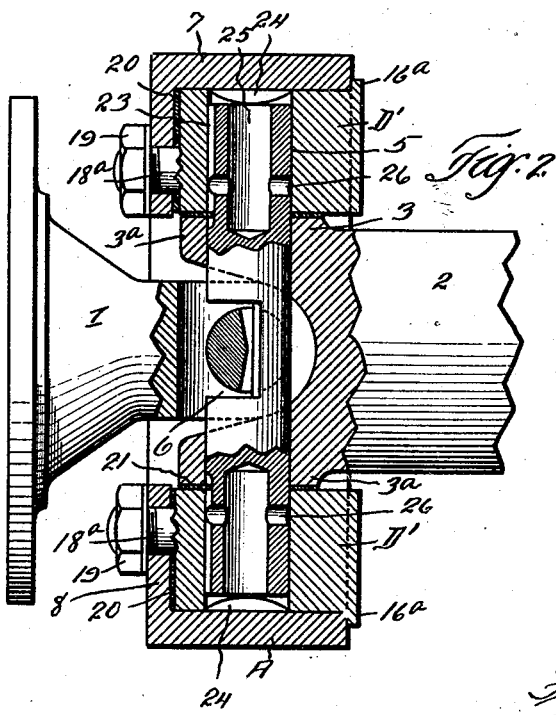
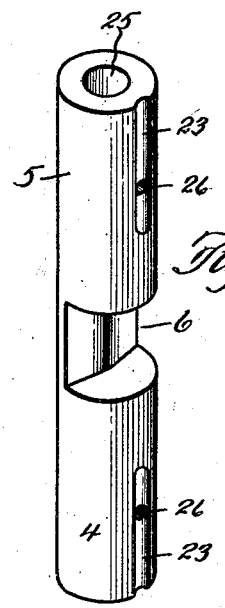
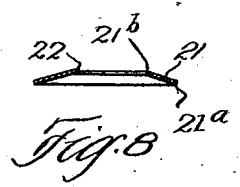
Inventor
Frederick W. Peters
By Hull, Brock & West
Attys.

March 15, 1927.　　　F. W. PETERS　　　1,621,216
UNIVERSAL JOINT
Filed May 1, 1924　　　2 Sheets-Sheet 2

Inventor
Frederick W. Peters,
By Hull, Brock & West.
Attys.

Patented Mar. 15, 1927.

1,621,216

UNITED STATES PATENT OFFICE.

FREDERICK W. PETERS, OF CLEVELAND, OHIO, ASSIGNOR TO SPICER MANUFACTURING CORPORATION, OF SOUTH PLAINFIELD, NEW JERSEY, A CORPORATION OF VIRGINIA.

UNIVERSAL JOINT.

Application filed May 1, 1924. Serial No. 710,207.

This invention relates to universal joints, and more particularly to joints of the character wherein the trunnions are mounted in and connected by a member in the shape of a ring having a chamber or chambers for lubricant therein. It is the general purpose and object of the invention to provide a construction of universal joint of this character wherein the trunnions may be efficiently lubricated.

Figure 4:
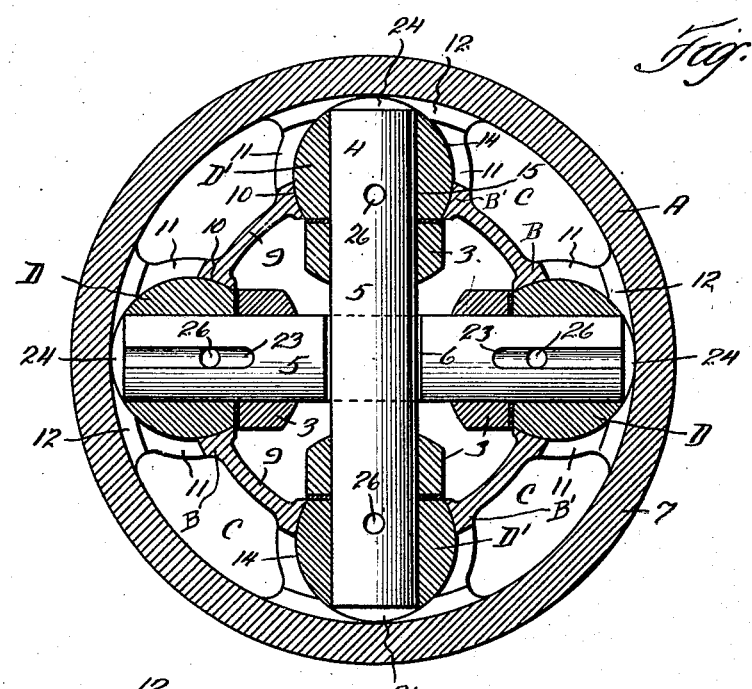
Figure 5:
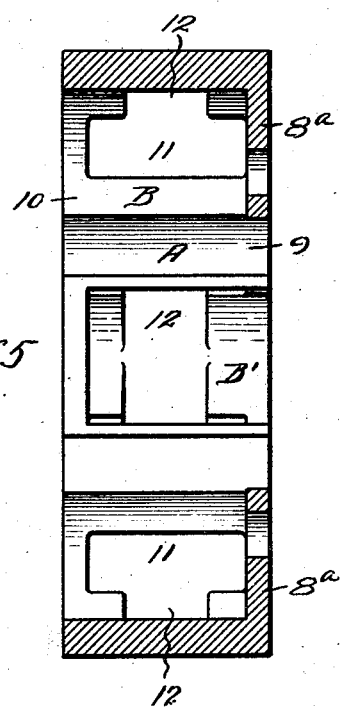
Figure 6:
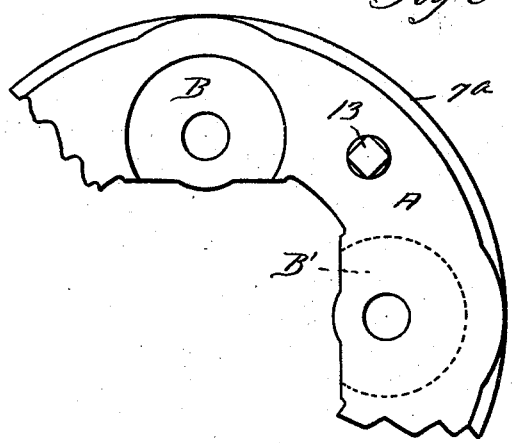

Further and more limited objects of the invention will appear hereinafter and will be realized in and through the construction and arrangement of parts shown in the drawings, wherein Fig. 1 represents a sectional elevation of a universal joint embodying the invention; Fig. 2 a similar view taken at right angles to Fig. 1; Fig. 3 a detail in perspective of one of the cross pins; Fig. 4 a central sectional view through the ring, showing the pins and trunnions in elevation; Fig. 5 a sectional view through the connecting ring; Fig. 6 a detail in elevation of said connecting ring; and Figs. 7 and 8 are details in plan and section, respectively, of the spring washer which surrounds each trunnion.

Describing the various parts by reference characters, 1 and 2 denote hubs, connected respectively with the driving and the driven shaft sections (not shown). The hubs are provided each with a yoke 3 each having mounted therein a cross pin 4, the outer ends of each cross pin constituting trunnions 5. Each cross pin is provided with a central recess 6 of slightly greater depth than the radius of such pin, each recess being about 210 degrees in angular extent. The trunnions are adapted to be mounted in bearing blocks carried by and mounted within a connecting member in the form of a ring, the ring being indicated generally at A. The ring is preferably made from a drop forging and is provided with a cylindrical wall 7, annular side walls 8, 8$^a$, and a segmental inner wall 9. For strengthening purposes, the ring may be provided with a central circumferential rib 7$^a$.

Formed in the ring thus provided are transversely extending seats B and B' for the bearing blocks. The seats B are arranged diametrically opposite each other and the seats B' are also arranged diametrically opposite each other but are spaced each 90 degrees from a seat B. The seats B extend through one of the side walls 8 toward but not including the other side wall 8$^a$ of the ring; and the block-receiving walls 10 of such seats are each a section of a cylinder having a circumferential extent in excess of 180 degrees, whereby the seats prevent radial inward movement of the bearing blocks which are adapted to fit therewithin. The seats B' are constructed identically like the seats B, except that they extend inwardly from the opposite side 8$^a$ of the ring; that is, through the side wall 8$^a$ toward, but not including, the side wall 8.

It will be noted that the space between the outer wall 7 and the segmental inner wall 9 is divided into a plurality of chambers C, said chambers being separated from each other by means of the side walls of the seats B and B' and by the bearing blocks inserted within such seats. Each chamber C is adapted to communicate with the interior of the adjacent seats B, B' by means of large openings 11 formed in the walls of said seats, thereby to lubricate the outer surfaces of the bearing blocks. The chambers C are enabled to communicate with each other and to provide for the circulation of lubricant by centrifugal action, by means of ports 12, formed in the outer portions of the seats B, B', said ports and ports beyond the trunnions forming passages connecting adjacent chambers C and located adjacent to the inner face of the wall 7. The ports 12 merge at their inner ends with the openings 11. (See Figs. 4 and 5.) For the purpose of supplying the chambers with lubricant, one of such chambers is provided with a filling plug 13.

Cooperating with the seats B, B' are the bearing blocks, which are indicated generally at D and D', the blocks D fitting within the seats B and the blocks D' within the seats B'. Each block is of such shape in cross section as to enable it to fit snugly within its appropriate seat and each is provided with an external wall 14 of the same shape as the wall 10, with the exception that the cylindrical bore 15 in each block is extended through the outer surface thereof.

Each of the blocks D, D' is provided with a flange 16, 16$^a$, respectively, which flanges are adapted to engage the walls 8, 8$^a$, respectively; and each block D, D' is also provided at its opposite end with a threaded stud 18, 18ª respectively, which is adapted to extend through an opening in the wall 8 or 8ª, the blocks being drawn to their seats by means of nuts 19 on such studs. Between the inner end of each block and the inner face of the wall 8 or 8ª is inserted a gasket 20 surrounding a stud 18 or 18ª.

The bearing blocks D' are identical with the bearing blocks D, being inserted in the ring in the opposite direction from the blocks D. Between each bearing block and the adjacent shoulder 3ª on the adjacent yoke, and surrounding each trunnion, is a washer 21 of spring metal, each washer normally having its outer edge 21ª in a different plane from its inner edge 21ᵇ and being provided with a projection 22 adapted to enter a vertical groove 23 formed in the adjacent outer wall of the trunnion. It will be evident that, when the parts are assembled, the inner and outer edges of each washer will be forced into approximately the same plane, forming a tight joint between the inner face of each bearing block and the shoulder 3ª adjacent thereto. The projections 22 serve to align the pins and the bearing blocks while preventing the passage of lubricant inwardly beyond such projections and their respective washers.

Each bearing block is provided with a port 24 adapted to register with the ports 12 and form therewith a continuous passage extending across the end of each trunnion and between the same and the inner face of the wall 7 and connecting adjacent chambers C. The ports 12 and 24 communicate with a central chamber 25 formed within the outer portion of each trunnion, from which chamber ports 26 extend to the seat provided for each trunnion within its bearing block. It should be noted that the ports 26 extend at right angles to the plane of rotation of the ring, which enables the lubricant to be discharged freely through such ports, between the trunnions and their bearing blocks, as no driving thrust is exerted on the sides of the trunnions which carry the ports, thereby to interfere with such distribution. By the construction of the lubricating parts, the bearing blocks will be effectively lubricated by the ports or openings 11 and the spaces between the trunnions and their seats will be likewise effectively lubricated by the passages 12 and 24 and the chambers 25 and ports 26 and 23.

With the parts constructed and arranged as described, one of the hubs, with its trunnions and bearing blocks and with the thrust blocks applied to such trunnions can be readily applied to the ring by a lateral movement, inserting the bearing blocks into their appropriate seats with the washers 21 and packing rings 20 in place, then setting up the nuts 19 to draw the blocks to their seats. The opposite hub, with its trunnions and bearing blocks, can be applied in like manner to the ring but from the opposite side thereof. The recessing of the central portions of the cross pins 6 enables them to be assembled, with their bearing blocks, by a movement of either hub toward the other, and to be assembled with the axes of the trunnions in the same plane; and the angular extent of the recesses accommodates the relative movement of the hubs and pins.

As the joint rotates, the lubricant is forced outwardly in each chamber C by centrifugal action as well as in the direction of the rotation of the joint, with the result that there is a pressure exerted by the lubricant on one side of the outer portion of each block D, D', with a partial vacuum on the outer portion of the opposite side of each such block. Because of this action and the arrangement of the chambers 25, grooves 23 and ports 26, lubricant will always be interposed between each trunnion 5 and the surrounding portion of its bearing block, provided only that some lubricant is present in the chambers C. Furthermore by having the grooves 23 intersect each a port 26, a corresponding saving in the bearing surface of each trunnion is obtained.

By the construction shown and described herein, a universal joint of the character described may be produced in an extremely convenient and economical manner; the parts comprising the joint may be conveniently assembled and disassembled; and a lubricating joint will be produced from such assembly which will be efficient in operation, and capable of long and extensive use, and which will ensure the presence of lubricant around the entire bearing surface of each trunnion, irrespective of variations in the amount of lubricant in the chambers of the ring.

Having thus described my invention, what I claim is:—

1. In a universal joint, the combination, with a driving and a driven member and trunnions carried thereby, of a connecting ring having seats for said trunnions and lubricant chambers between said seats, adjacent chambers communicating by passages extending through said seats beyond the ends of the trunnions, each trunnion having a bore in the outer end thereof and provided with one or more ports extending laterally from the bore adjacent the bottom thereof to the seat in which said trunnion is mounted.

2. In a universal joint, the combination, with a driving and a driven member and trunnions carried thereby, of a connecting ring having seats for said trunnions and lubricant chambers between said seats, adjacent chambers communicating by passages extending beyond the ends of the trunnions, each trunnion having a bore extending inwardly from its outer end and provided with one or more ports extending laterally from said bore adjacent the bottom thereof to the seat in which the trunnion is mounted, and a washer surrounding each trunnion between such lateral port or ports and the central portion of the joint, the driving and driven members being provided with shoulders cooperating with said washers.

3. In a universal joint, the combination with a driving and a driven member, each having a yoke and each yoke being provided with a bearing face or shoulder at its outer ends, of cross pins mounted in said yokes and having trunnions, a connecting ring having seats for said trunnions and chambers for lubricant interposed between said seats, adjacent chambers communicating by means of a passage extending across the outer ends of the trunnions, a washer surrounding each trunnion and interposed between the adjacent shoulder and the seat for said trunnion, each trunnion having a bore extending inwardly from the outer end thereof and being provided with one or more ports near the bottom of said bore extending at an angle with respect to the plane of rotation of said ring and communicating with said bore and with the seat surrounding such trunnion.

4. In a universal joint, the combination with a driving and a driven member, each having a yoke and each yoke being provided with bearing faces or shoulders at its outer ends, of cross pins mounted in said yokes and having trunnions, a connecting ring having seats for said trunnions and chambers for lubricant interposed between said seats, adjacent chambers communicating by means of passages extending across the outer ends of the trunnions, a washer surrounding each trunnion and interposed between the adjacent shoulder and the seat for said trunnion, each trunnion having a bore extending inwardly from the outer end thereof and being provided with one or more ports extending at an angle with respect to the plane of rotation of said ring and communicating with said bore and with the seat surrounding such trunnion, and each trunnion having also a groove extending inwardly from the outer end thereof with which the outer end of one of such ports communicates, and each washer having a projection fitting within such groove, inwardly of such port.

5. In a universal joint, the combination, with a driving and a driven member and trunnions carried thereby, of a connecting ring having seats for said trunnions, the said ring having lubricant chambers interposed between the said seats, adjacent chambers communicating with each other by means of passages extending beyond the ends of the trunnions, and each trunnion having a bore extending inwardly from the outer end thereof and provided with a port communicating with such bore and with the seat for the trunnion, the said port extending substantially at right angles to the plane of rotation of the said ring.

6. In a universal joint, the combination, with a driving and a driven member and trunnions carried thereby, there being a shoulder surrounding the inner end of each trunnion, of a connecting ring having seats for said trunnions and provided between such seats with chambers for lubricant, adjacent lubricant chambers communicating with each other by passages extending beyond the ends of the trunnions and each trunnion having a bore extending inwardly from the outer end thereof and provided with a port communicating with such bore at one end and having its other end communicating with a port provided between the outer wall of the trunnion and the seat therefor and extending inwardly from the outer end of the trunnion, and a washer surrounding each trunnion and interposed between the seat therefor and the shoulder for such trunnion, the first mentioned port extending at substantially right angles to the plane of rotation of said ring, each bearing block seat having ports or openings communicating with said chambers on opposite sides thereof.

7. In a universal joint, the combination, with a driving and a driven member and trunnions carried thereby, there being a shoulder surrounding each trunnion, of a connecting ring having seats for said trunnions and provided between such seats with chambers for lubricant, adjacent lubricant chambers communicating with each other by passages extending beyond the ends of the trunnions and each trunnion having a bore extending inwardly from the outer end thereof and provided with a port communicating with said bore and having its outer end communicating with a port formed in the outer face of the trunnion and extending inwardly from the outer end thereof, the first mentioned port extending at substantially right angles to the plane of rotation of said ring, and a washer surrounding each trunnion and interposed between the shoulder and the seat therefor, the said washer having a projection fitting within the port formed within the outer wall of the trunnion.

8. In a universal joint, the combination, with a driving and a driven member and trunnions carried thereby, of a connecting ring having seats, bearing blocks for said trunnions mounted in said seats, and lubricant chambers between said seats, adjacent chambers communicating by passages extending beyond the ends of the trunnions, and each trunnion having a bore extending inwardly from its outer end and provided with one or more ports extending laterally from such bore to the inner face of the bearing block in which the trunnion is mounted, and a washer surrounding each trunnion between such lateral port or ports and the central portion of the joint, the driving and driven members being provided with shoulders cooperating with said washers, each bearing-block seat having ports or openings in opposite sides thereof communicating with the chambers on opposite sides of such block.

9. In a universal joint, the combination with a driving and a driven member, each having a yoke and each yoke being provided with bearing faces or shoulders at its outer ends, of cross pins mounted in said yokes and having trunnions, a connecting ring having seats, bearing blocks for said trunnions mounted in said seats and chambers for lubricant interposed between said seats, adjacent chambers communicating by means of passages extending across the outer ends of the trunnions, a washer surrounding each trunnion and interposed between the adjacent shoulder and the seat for such trunnion, each trunnion having a bore extending inwardly from the outer end thereof and being provided with one or more ports extending at an angle with respect to the plane of rotation of said ring and communicating with said bore and with the seat surrounding such trunnion in its bearing block, each trunnion having also a groove extending inwardly from the outer end thereof with which the outer end of one of such ports communicates, and each washer having a projection fitting within such groove and inwardly of such port, and each bearing-block seat having openings or ports in opposite sides thereof communicating with the chambers on opposite sides of such block.

10. In a universal joint, the combination, with a driving and a driven member and trunnions carried thereby, of a connecting ring having seats, bearing blocks for said trunnions in said seats, the said ring having lubricant chambers interposed between the said seats, adjacent chambers communicating with each other by means of passages extending beyond the ends of the trunnions, and each trunnion having a bore extending inwardly from the outer end thereof and provided with a port communicating with such bore and with the seat for the trunnion in its bearing block, and each bearing-block seat having openings communicating with the chambers on opposite sides thereof.

11. In a universal joint, the combination, with a driving and a driven member each having a trunnion, there being a shoulder surrounding the inner portion of each trunnion, of a hollow lubricant-containing ring having seats provided each with a radial opening for a trunnion, each trunnion having in its outer face a groove extending inwardly from the outer end thereof, and a spring washer surrounding each trunnion and normally having one edge thereof in a different plane from the other edge whereby, when assembled between the shoulder surrounding the trunnion and the seat for the trunnion, one edge of the washer will be forced into engagement with the seat and the opposite edge into engagement with the shoulder, the said washers each having a projection at its inner edge adapted to enter the said groove.

In testimony whereof, I hereunto affix my signature.

FREDERICK W. PETERS.